United States Patent
Heinold et al.

(10) Patent No.: US 9,224,507 B2
(45) Date of Patent: Dec. 29, 2015

(54) SYSTEMS AND METHODS FOR MANAGING SHARED-PATH INSTRUMENTATION AND IRRADIATION TARGETS IN A NUCLEAR REACTOR

(71) Applicant: GE-Hitachi Nuclear Energy Americas, LLC, Wilmington, NC (US)

(72) Inventors: Mark R. Heinold, San Jose, CA (US); John F. Berger, Wilmington, NC (US); Milton H. Loper, San Jose, CA (US); Gary A. Runkle, San Jose, CA (US)

(73) Assignee: GE-Hitachi Nuclear Energy Americas, LLC, Wilmington, NC (US)

( * ) Notice: Subject to any disclaimer, the term of this patent is extended or adjusted under 35 U.S.C. 154(b) by 532 days.

(21) Appl. No.: 13/709,524

(22) Filed: Dec. 10, 2012

(65) Prior Publication Data

US 2013/0177125 A1 Jul. 11, 2013

Related U.S. Application Data

(63) Continuation-in-part of application No. 13/477,244, filed on May 22, 2012, and a continuation-in-part of application No. 13/339,345, filed on Dec. 28, 2011.

(51) Int. Cl.
*G21C 19/32* (2006.01)
*G21C 19/00* (2006.01)
*G21G 1/02* (2006.01)
*G21C 23/00* (2006.01)

(52) U.S. Cl.
CPC ............... *G21C 19/00* (2013.01); *G21C 19/32* (2013.01); *G21C 23/00* (2013.01); *G21G 1/02* (2013.01)

(58) Field of Classification Search
USPC ........................................... 376/342
See application file for complete search history.

(56) References Cited

U.S. PATENT DOCUMENTS

| | | |
|---|---|---|
| 3,940,318 A | 2/1976 | Arino |
| 4,196,047 A | 4/1980 | Mitchem |
| 4,393,510 A | 7/1983 | Lang |
| 4,663,111 A | 5/1987 | Kim |
| 5,910,971 A | 6/1999 | Ponomarev-Stepnoy |
| 6,678,344 B2 | 1/2004 | O'Leary |
| 2004/0105520 A1 | 6/2004 | Carter |

(Continued)

OTHER PUBLICATIONS

"Traversing Incore Probe System," General Electric Systems Technology Manual, Chapter 5.6, Dec. 5, 2012.

*Primary Examiner* — Jack W Keith
*Assistant Examiner* — Sean P Burke
(74) *Attorney, Agent, or Firm* — Ryan Alley Intellectual Property Law

(57) ABSTRACT

Systems and methods permit discriminate access to nuclear reactors. Systems provide penetration pathways to irradiation target loading and offloading systems, instrumentation systems, and other external systems at desired times, while limiting such access during undesired times. Systems use selection mechanisms that can be strategically positioned for space sharing to connect only desired systems to a reactor. Selection mechanisms include distinct paths, forks, diverters, turntables, and other types of selectors. Management methods with such systems permits use of the nuclear reactor and penetration pathways between different systems and functions, simultaneously and at only distinct desired times. Existing TIP drives and other known instrumentation and plant systems are useable with access management systems and methods, which can be used in any nuclear plant with access restrictions.

19 Claims, 6 Drawing Sheets

(56) References Cited

U.S. PATENT DOCUMENTS

| | | |
|---|---|---|
| 2009/0135983 A1 | 5/2009 | Russell, II |
| 2009/0213977 A1* | 8/2009 | Russell et al. ............... 376/170 |
| 2011/0051872 A1 | 3/2011 | Rickard |
| 2011/0051874 A1 | 3/2011 | Allen |
| 2011/0051875 A1* | 3/2011 | Bloomquist et al. .......... 376/202 |
| 2011/0216868 A1 | 9/2011 | Russell, II |
| 2012/0001012 A1 | 1/2012 | Yasuta |
| 2013/0177126 A1 | 7/2013 | Runkle et al. |

* cited by examiner

SYSTEMS AND METHODS FOR MANAGING SHARED-PATH INSTRUMENTATION AND IRRADIATION TARGETS IN A NUCLEAR REACTOR

PRIORITY STATEMENT

This application is a continuation-in-part of, and claims priority under 35 U.S.C. §120 to, co-pending application Ser. No. 13/477,244 filed May 22, 2012, the contents of said application being incorporated by reference herein in their entirety.

GOVERNMENT SUPPORT

This invention was made with Government support under contract number DE-FC52-09NA29626, awarded by the U.S. Department of Energy. The Government has certain rights in the invention.

BACKGROUND

Elements, and specific isotopes thereof, may be formed by bombarding parent materials with appropriate radiation to cause a conversion to desired daughter isotopes. For example, precious metals and/or radioisotopes may be formed through such bombardment. Conventionally, particle accelerators or specially-designed, non-commercial test reactors are used to achieve such bombardment and produce desired isotopes in relatively small amounts.

Radioisotopes have a variety of medical and industrial applications stemming from their ability to emit discreet amounts and types of ionizing radiation and form useful daughter products. For example, radioisotopes are useful in cancer-related therapy, medical imaging and labeling technology, cancer and other disease diagnosis, and medical sterilization.

Radioisotopes having half-lives on the order of days or hours are conventionally produced by bombarding stable parent isotopes in accelerators or low-power, non-electricity-generating reactors. These accelerators or reactors are on-site at medical or industrial facilities or at nearby production facilities. Especially short-lived radioisotopes must be quickly transported due to the relatively quick decay time and the exact amounts of radioisotopes needed in particular applications. Further, on-site production of radioisotopes generally requires cumbersome and expensive irradiation and extraction equipment, which may be cost-, space-, and/or safety-prohibitive at end-use facilities.

SUMMARY

Example embodiments include systems and methods for allowing access to nuclear reactor internals between multiple systems, such as irradiation target loading/offloading systems, instrumentation systems, and other external systems that may need access to the reactor during operations or times of general inaccessibility. Example systems provide penetration pathways to the reactor from exterior, accessible points. Example systems further permit users and operators to selectively allow/disallow such access among several systems. For example, an example embodiment system can use any type of selection mechanism to connect only desired systems into a penetration pathway accessing the reactor, while blocking other systems from the same access. Such selective management of access may permit multiple, simultaneous use of the nuclear reactor and penetration pathways between different systems and functions. For example, instrumentation delivery and measurement in instrumentation tubes may be performed simultaneously with irradiation target irradiation in a core of the reactor, when such targets are separately deliverable and harvestable through a selection mechanism. Such management may reduce or prevent interference between multiple systems and uses, while ensuring that accidental or harmful access to a nuclear reactor during access-limited times is reduced or prevented.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
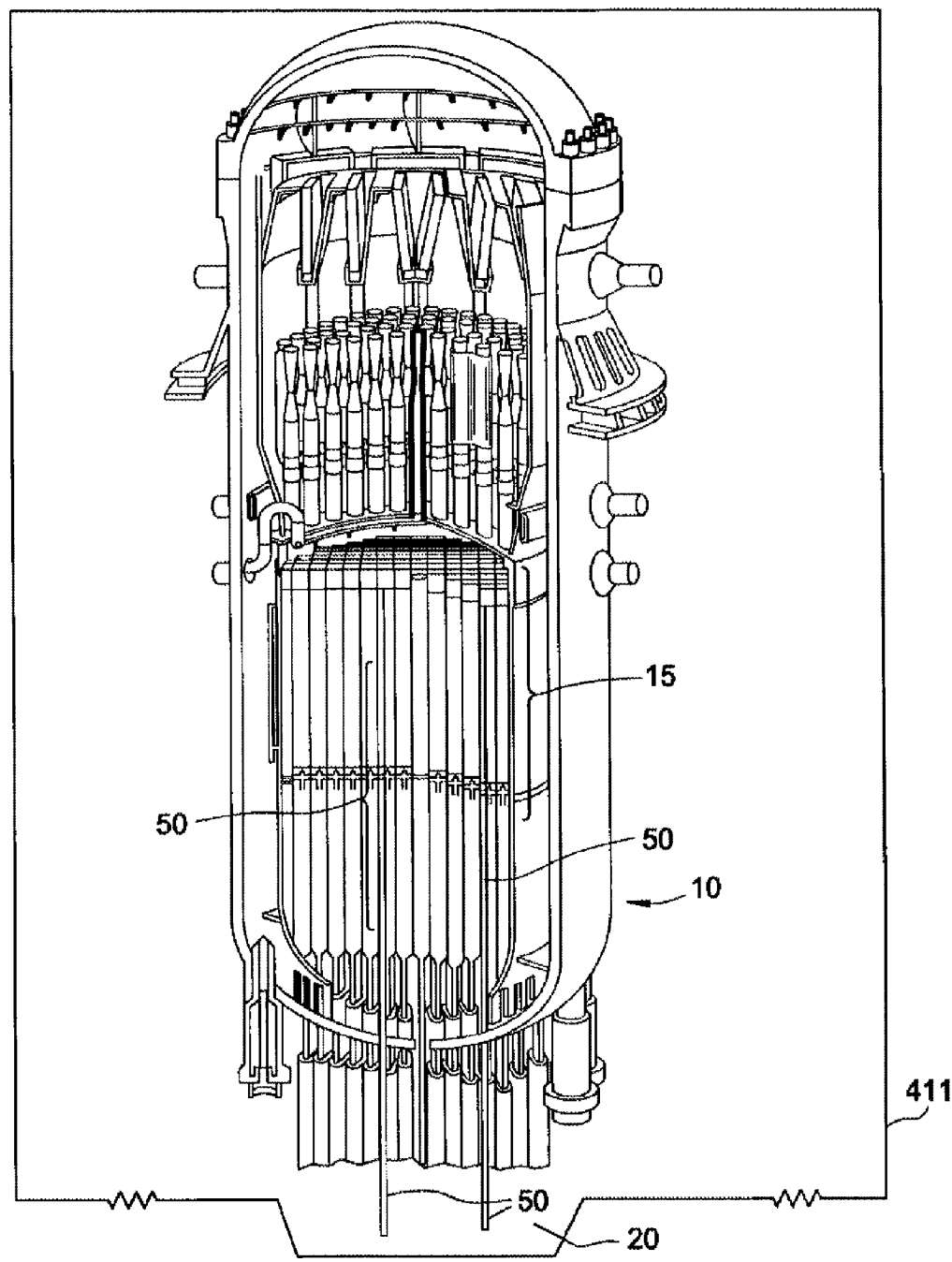
FIG. 1 is an illustration of a conventional commercial nuclear reactor.

This is a patent document, and general broad rules of construction should be applied when reading and understanding it. Everything described and shown in this document is an example of subject matter falling within the scope of the appended claims. Any specific structural and functional details disclosed herein are merely for purposes of describing how to make and use example embodiments. Several different embodiments not specifically disclosed herein fall within the scope of the appended claims; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to in a spatial or physical relationship, as being "connected," "coupled," "mated," "attached," or "fixed," to another element, it can be directly connected or coupled to the other element or intervening elements may be present. In contrast, when an element is referred to as being "directly connected" or "directly coupled" to another element, for example, there are no intervening elements present. Other words used to describe the relationship between elements should be interpreted in a like fashion (e.g., "between" versus "directly between", "adjacent" versus "directly adjacent", etc.). Similarly, a term such as "communicatively connected" includes all variations of information exchange routes between two devices, including intermediary devices, networks, etc., connected wirelessly or not.

As used herein, the singular forms "a", "an" and "the" are intended to include both the singular and plural forms, unless the language explicitly indicates otherwise with words like "only," "single," and/or "one." It will be further understood that terms like "have," "having," "comprises," "comprising," "includes," and/or "including," when used herein, specify the presence of stated features, steps, operations, elements, ideas, and/or components, but do not themselves preclude the presence or addition of one or more other features, steps, operations, elements, components, ideas, and/or groups thereof.

It should also be noted that the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from the single operations described below. It should be presumed that any embodiment having features and functionality described below, in any workable combination, falls within the scope of example embodiments.

FIG. 1 is an illustration of a conventional nuclear reactor pressure vessel 10 usable with example embodiments and example methods. Reactor pressure vessel 10 may be, for example, a 100+ MWe commercial light water nuclear reactor conventionally used for electricity generation throughout the world. Reactor pressure vessel 10 is conventionally contained within an access barrier 411 that serves to contain radioactivity in the case of an accident and prevent access to reactor 10 during operation of the reactor 10. As defined herein, an access barrier is any structure that prevents human access to an area during operation of the nuclear reactor due to safety or operational hazards such as radiation. As such, access barrier 411 may be a containment building sealed and inaccessible during reactor operation, a drywell wall surrounding an area around the reactor, a reactor shield wall, a human movement barrier preventing access to instrumentation tube 50, etc.

A cavity below the reactor vessel 10, known as a drywell 20, serves to house equipment servicing the vessel such as pumps, drains, instrumentation tubes, and/or control rod drives. As shown in FIG. 1 and as defined herein, at least one instrumentation tube 50 extends into the vessel 10 and near, into, or through core 15 containing nuclear fuel and relatively high levels of neutron flux and other radiation during operation of the core 15. As existing in conventional nuclear power reactors and as defined herein, instrumentation tubes 50 are enclosed within vessel 10 and open outside of vessel 10, permitting spatial access to positions proximate to core 15 from outside vessel 10 while still being physically separated from innards of the reactor and core by instrumentation tube 50. Instrumentation tubes 50 may be generally cylindrical and may widen with height of the vessel 10; however, other instrumentation tube geometries may be encountered in the industry. An instrumentation tube 50 may have an inner diameter of about 1-0.5 inch, for example.

Instrumentation tubes 50 may terminate below the reactor vessel 10 in the drywell 20. Conventionally, instrumentation tubes 50 may permit neutron detectors, and other types of detectors, to be inserted therein through an opening at a lower end in the drywell 20. These detectors may extend up through instrumentation tubes 50 to monitor conditions in the core 15. Examples of conventional monitor types include wide range detectors (WRNM), source range monitors (SRM), intermediate range monitors (IRM), and traversing Incore probes (TIP). Access to the instrumentation tubes 50 and any monitoring devices inserted therein is conventionally restricted to operational outages due to containment and radiation hazards.

Although vessel 10 is illustrated with components commonly found in a commercial Boiling Water Reactor, example embodiments and methods are useable with several different types of reactors having instrumentation tubes 50 or other access tubes that extend into the reactor. For example, Pressurized Water Reactors, Heavy-Water Reactors, Graphite-Moderated Reactors, etc. having a power rating from below 100 Megawatts-electric to several Gigawatts-electric and having instrumentation tubes at several different positions from those shown in FIG. 1 may be useable with example embodiments and methods. As such, instrumentation tubes useable in example methods may be at any geometry about the core that allows enclosed access to the flux of the nuclear core of various types of reactors.

Applicants have recognized that instrumentation tubes 50 may be useable to relatively quickly and constantly generate short-term radioisotopes on a large-scale basis without interfering with an operating or refueling core 15. Applicants have further recognized a need to generate short-term radioisotopes and remove them from within access barrier 411 quickly, without having to shut down an operating nuclear reactor to access an area within access barrier 411. Example methods include inserting irradiation targets into instrumentation tubes 50 and exposing the irradiation targets to the core 15 while operating or producing radiation, thereby exposing the irradiation targets to the neutron flux and other radiation commonly encountered in the operating core 15. The core flux over time converts a substantial portion of the irradiation targets to a useful mass of radioisotope, including short-term radioisotopes useable in medical applications. Irradiation targets may then be withdrawn from the instrumentation tubes 50, even during ongoing operation of the core 15, and removed for medical and/or industrial use.

Applicants have further recognized a need for a maximized amount of radioisotope production within instrumentation tubes 50, but also identified that such need is limited by relatively few and sensitive pathways through access barrier 411 during operation. Such pathways through access barrier 411 may require compatibility with existing instrumentation, including TIP probes that are inserted into instrumentation tubes 50 during TIP runs. Example embodiments and methods address this problem by permitting irradiation targets 250 to be inserted into and removed from instrumentation tubes 50 from a first access point, while reliably permitting TIP tubes to be inserted and removed at other instances from the instrumentation tubes 50 from a second access point. In this way, multiple operations and use of instrumentation tubes 50 can be safely achieved in an access-sensitive environment such as a nuclear power plant.

Figure 2:
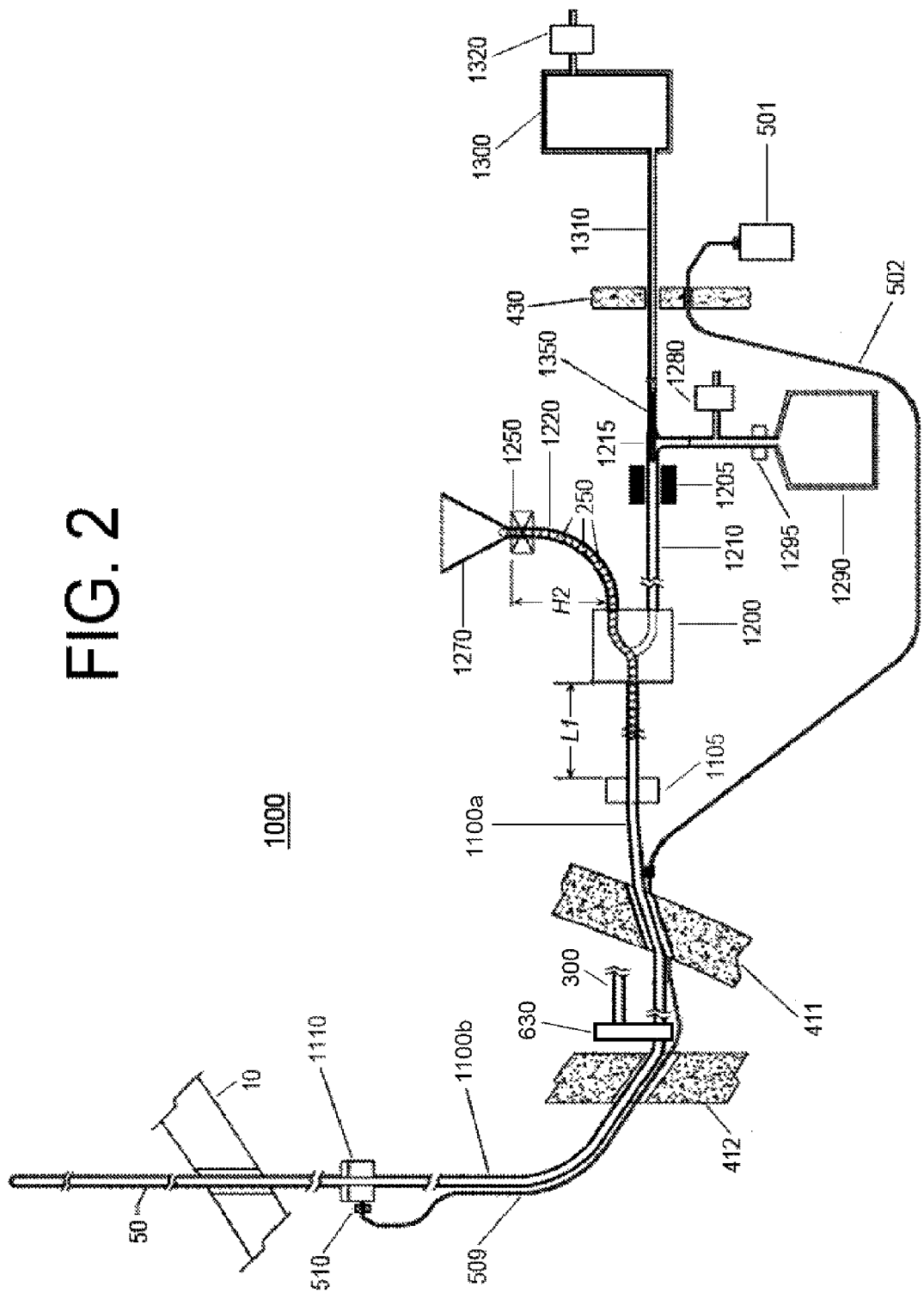
FIG. 2 is an illustration of an example embodiment irradiation target system with a system selector in a target loading configuration.

FIG. 2 is a schematic drawing of an example embodiment irradiation target delivery and retrieval system 1000 having a penetration pathway, a loading/offloading system, and a drive system. FIG. 2 illustrates various components of example system 1000 in a loading configuration, parts of which are also described in US Patent Publication 2013/0170927, titled "Systems and Methods for Processing Irradiation Targets Through a Nuclear Reactor," filed Dec. 28, 2011, said application incorporated by reference herein in its entirety. As shown in FIG. 2, example embodiment irradiation target delivery and retrieval system 1000 may include or use one or more elements to facilitate irradiation target loading, irradiation, and harvesting in a timely, automatic, and/or consumption-enhancing manner. System 1000 includes a penetration pathway that provides a path from outside access barrier 411 to instrumentation tube 50 for one or more irradiation targets, a loading/offloading system that permits new irradiation targets to be inserted and irradiated targets to be harvested outside access barrier 411, and a drive system that moves irradiation targets between instrumentation tube 50 and loading/offloading in example embodiment system 1000.

A penetration pathway in example embodiment system 1000 provides a reliable path of travel for irradiation targets 250 between an accessible location, such as an offloading or loading area outside access barrier 411 into one or more instrumentation tubes 50, so irradiation targets 250 can move within the pathway to a position in or near an operating nuclear core 15 for irradiation. Example pathways can include many delivery mechanisms used alone or in combination, including tubing, frames, wires, chains, conveyors, etc. in example embodiment system 1000 to provide a transit path for an irradiation target between an accessible location and an operating nuclear core. As a specific example shown in FIG. 2, a penetration pathway may include penetration tubing 1100, including 1100a and 1100b, running between, either in portions or continuously, a loading junction 1200 and instrumentation tube 50 in a nuclear reactor.

Penetration tubing 1100 may be flexible or rigid and sized to appropriately permit irradiation targets 250 to enter into and/or through penetration tubing 1100 and navigate various structures and penetrations in and within access barrier 411. Penetration tubing 1100 may be continuously sealed or include openings, such as at connecting junctions. Penetration tubing 1100 may junction with other tubes and/or structures and/or include interruptions. One possible advantage of penetration tubing 1100 being sealed and securely mating at junctures and/or with any terminal/originating points is that penetration tubing 1100 better maintains pneumatic pressure that can be used for target withdrawal, and also may provide additional containment for irradiation targets 250 and any products (gas, fluid, solid, particulate, etc.) formed as irradiation products in example embodiment system 1000.

Penetration tubing 1100 may be fabricated of a material that maintains its physical characteristics in an operating nuclear reactor environment and does not significantly react with or entrain materials from irradiation targets 250 coming into contact therewith, including, for example, aluminum, stainless steel, carbon steel, nickel alloys, PVC, PFA, rubber, etc. Penetration tubing 1100 may be cylindrical or any other shape that permits irradiation targets 250 to enter into and/or pass through penetration tubing 1100. For example, penetration tubing 1100 may have a generally circular cross section with a 0.5-inch diameter and smooth interior surface that permits spherical irradiation target 250 to roll within penetration tubing 1100. One potential advantage of using such an example penetration tubing 1100 may be roughly matching diameters and geometries with instrumentation tubes 50 for consistent irradiation target movement therein; however, alternate geometries, shapes, and sizes for penetration tubing 1100, or any other penetration pathway used in example embodiments, including those that limit movement, may be desirable, advantageous, and used.

Penetration tubing 1100 used in example embodiment system 1000 provides a route from an origin at loading junction 1200, where irradiation targets may enter/exit penetration tubing 1100 outside of access barrier 411. As shown in FIG. 2, for example, penetration tubing 1100 leads irradiation targets 250 from loading junction 1200 to access barrier 411, which may be, for example, a steel-lined reinforced concrete containment wall or drywell wall or any other access restriction in conventional nuclear power stations.

Penetration pathways usable in example embodiment system 1000 provide a route through access barrier 411 and to reactor vessel 10 where irradiation targets 250 may enter an instrumentation tube 50. For example, as shown in FIG. 2, penetration tubing 1100 penetrates access barrier 411 and extends to instrumentation tubes 50. Penetration tubing 1100 may pass through an existing penetration in access barrier 411, such as an existing TIP tube penetration, or may use a new penetration created for penetration tubing 1100. Penetration tubing 1100 negotiates or passes through any other objects inside of access barrier 411 before reaching instrumentation tube 50.

An annular reactor pedestal 412 may be present in a drywell 20 beneath reactor 10, and penetration tubing 1100 is shown in FIG. 2 passing through a penetration in pedestal 412. It is understood that penetration pathways may follow any number of different courses and negotiate different obstacles in different reactor designs aside from the specific example path shown with penetration tubing 1100 in FIG. 2. Similarly, penetration pathways need not be consistent or uniform; for example, penetration tubing 1100 may terminate on either side of, and be connected to, a penetration in pedestal 412 to permit irradiation targets 250 to pass through the penetration between penetration tubing 1100.

Penetration pathways useable in example embodiment system 1000 may terminate at or within an instrumentation tube 50. As shown in FIG. 2, penetration tubing 1100 terminates at a flange 1110 at a base of instrumentation tube 50, permitting irradiation targets 250 to pass from penetration tubing 1100 into instrumentation tube 50. Similarly, penetration tubing 1100 may join with an indexer that provides access to several instrumentation tubes 50 from a single penetration through reactor wall 411 and/or pedestal 412. Such a system is described in US Patent Publication 2013/0315361, titled "Systems and Methods for Processing Irradiation Targets Through Multiple Instrumentation Tubes in a Nuclear Reactor," filed May 22, 2012, said application incorporated herein by reference in its entirety.

Penetration pathways useable in example embodiments may be pre-existing in part or in whole and/or installed during access to containment areas and/or restricted access areas in a nuclear power plant, such as during a pre-planned outage. For example, penetration tubing 1100 may be installed in access barrier 411 during an outage, with penetration tubing 1100 being passed through penetrations in access barrier 411 and pedestal 412, moved and secured in an area within access barrier 411 and a drywell space 20 under reactor 10, and secured to flange 1110. Portions of penetration tubing 1100 extending outside access barrier 411 may be installed at loading junction 1200 at any time. Penetration tubing 1100 may be secured at various points inside access barrier 411 and/or divert around existing equipment to minimize congestion or clutter in a drywell 20 or other space bounded by access barrier 411 while preserving a traversable path for irradiation targets 250 to and from instrumentation tube 50. Again, other penetration pathways, including wire guides, meshes, compartments, bored tunnels, etc. are useable in example embodiments to provide a path from outside an access-restricted area such as containment to an instrumentation tube of an operating nuclear reactor.

System 1000 may be dual purpose throughout and equally used with a TIP drive or other instrumentation and reactor components. Or system 100 may be exclusively dedicated to isotope production and harvesting with its own driving mechanism, pathways, reservoirs, etc. and excluding use with other instrumentation or a TIP drive. Or system 1000 may be exclusive in some part and shared in others. For example, outside of pedestal 412 and/or drywell 20, example embodiment system 1000 may be dedicated to irradiation target production and harvesting. Within pedestal 412 and drywell 20, space may be at a premium and installation of new dedicated components and/or movement of other components may be undesirable, such that example system 1000 may use and share pathways with conventional TIP drives and instrumentation.

Dual shared functionality can be achieved in several ways. For example, as shown in FIG. 2, within pedestal 412, penetration pathway 1100 may be a shared penetration pathway 1100b useable to transport both irradiation targets 250 and other conventional devices including TIP runs. Outside of pedestal 412, penetration pathway may be an exclusive pathway 1100a used only for irradiation target 250 transport and harvesting. A system selector 630 is capable of selectively providing access to at least shared penetration pathway 1100b inside pedestal 412 between several systems. For example, existing TIP tubing 300 and exclusive pathway 1100a may be selectively connected to shared pathway 1100b via system selector 630. Of course, more than one system selector 630 may be useable in example system 1000, and/or system selector 630 may be used at other points besides outside of pedestal 412 to provide access to shared pathways for multiple existing and/or new systems.

System selector 630 may selectively provide access to shared pathway 1100b at any desired time. For example, exclusive pathway 1100a can be given access during times of irradiation target insertion and/or withdrawal, while TIP tubing 300 can be given access during standard TIP runs while irradiation targets 250 are not using shared pathway 1000b, such as when all irradiation targets 250 are harvested or being held within particular instrumentation tubes 50. In this way, simultaneous irradiation of irradiation targets and TIP runs to multiple instrumentation tubes may be performed. System selector 630 may be operated manually, remotely, and/or automatically, based on time frames and/or detected plant conditions, for example. Similarly, system selector 630 may be useable with retention mechanisms and other systems in US Patent Publication 2013/0177126 titled, "Systems and Methods for Retaining and Removing Irradiation Targets in a Nuclear Reactor," by Runkle et al., filed Dec. 10, 2012, said application being incorporated by reference in its entirety herein. System selector 630 may further be useable in the systems described in incorporated application Ser. No. 13/477,244 at flange 1110 to replace and/or be used with various mechanisms described therein for selecting systems.

Figure 3:
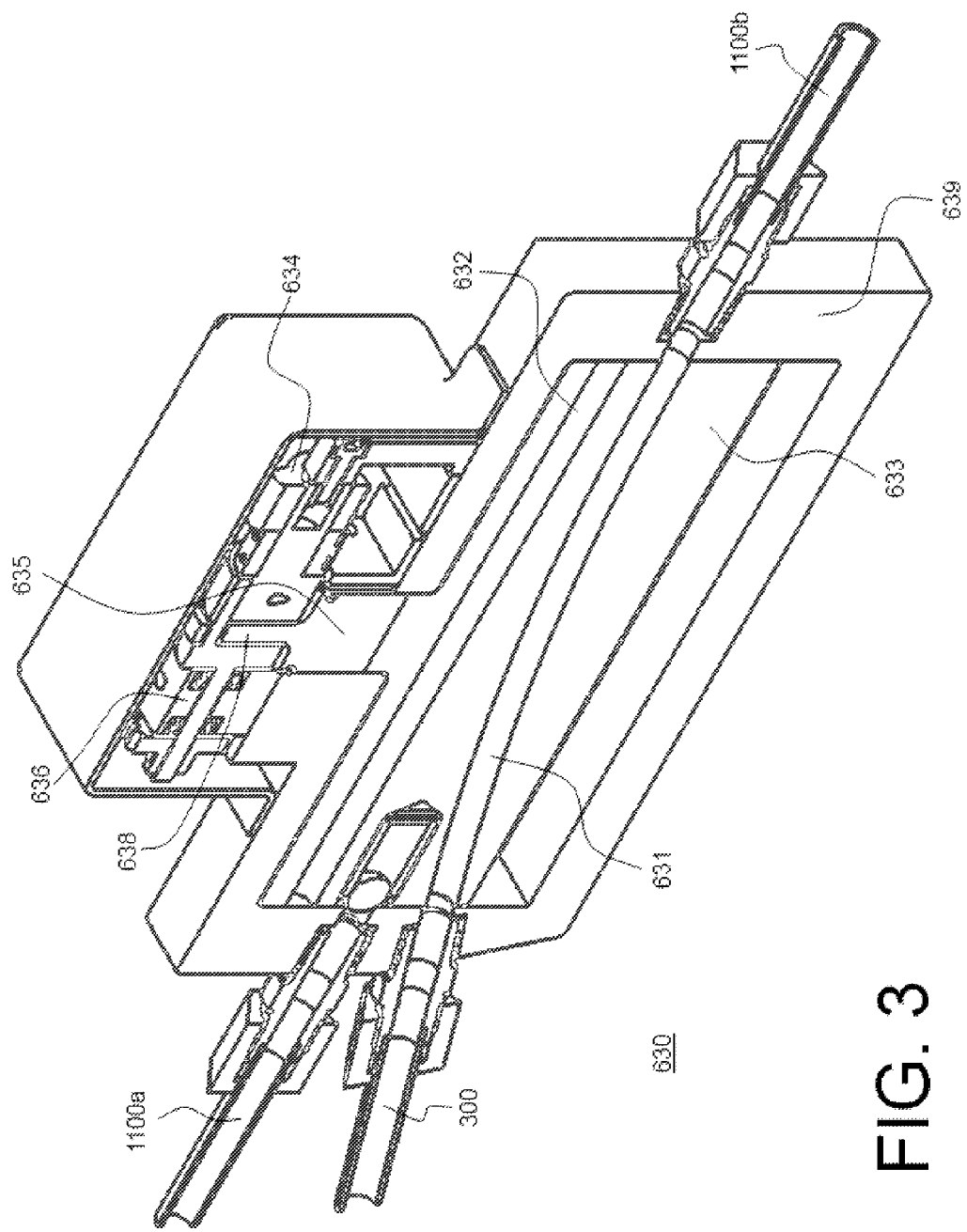
FIG. 3 is an illustration of an example embodiment system selector.

FIG. 3 is an illustration of a cross-section of an example embodiment system selector 630. As shown in FIG. 3, example embodiment system selector 630 includes a selection block 633 coupled to at least one motor 634. Selection block 633 provides several different pathways, depending on its position. For example, selection block 633 may include two distinct paths 631 and 632 with openings vertically spaced from one another. A higher distinct path 632 may connect to an exclusive pathway 1100a that services components of an irradiation target loading and harvesting system, while a lower distinct path 631 may connect to a TIP tube 300 servicing conventional TIP drives and sensors or other instrumentation. Based on the vertical positioning of selection block 633, only one of paths 631 and 632 may align with, and open into, shared pathway 1100b headed toward an instrumentation tube 50 (FIG. 2). For example, as shown in FIG. 3, only lower distinct path 631 joins to shared pathway 1100b, such that only TIP Tube 300 and instrumentation therein can access shared pathway 1100b and an instrumentation tube, while exclusive pathway 1100a and instrumentation targets moving therethrough are blocked from shared pathway 1100b. Vertical movement of selection block 633 may reverse this functionality.

Selection block 633 can be fabricated out of a variety of materials that are compatible with an operating nuclear reactor environment and transport of radioisotopes and instrumentation. For example, aluminum or stainless steel alloys may be useable for selection block 633, as may be high-grade plastics or ceramics. Distinct paths 632 and 631 may be formed of or from the same materials and have relatively smooth and continuous inner surfaces and a shape that matches anticipated instrumentation and irradiation targets 250, so as to provide smooth passage through the paths 631 and 632 without significant material entrainment or snagging. Although irradiation targets 250 are shows as spheres in some example embodiment systems, it is understood that paths 632 and/or 631 can be shaped and sized to accommodate a variety of shapes and configurations of both irradiation targets and instrumentation, including prismatic shapes, obloids, wires, chains, etc.

Example embodiment system selector 630 may join selector block 633 to motors 634 through a sealed piston 635 and crankshaft 638 that may include groves that mate with a gear of motor 634, or through any other powered arrangement. For example, motor 634 may be sized and keyed to crankshaft 638 such that an exact half-rotation of motor 634 moves selector block 633 the required distance to alternate between pathways 632 and 631, improving reliability and predictability of position of selector block 633. Example embodiment system selector 630 may further include one or more electrical switches and actuator 636 to provide appropriate control to motor 634. For example, switches and actuator 636 may be set to provide exact rotation of motor 634 for reliable movement of selection block 633, and/or actuator 636 may be programmed to appropriately time movement of selection block 633 at desired instances. In this way, example embodiment system selector 630 may be a self-contained operational unit with self-provided fail-safe and standard operating characteristics. Of course, remote communications from a control room or other outside operator may also be provided to example embodiment system selector 630 through any communicative connection such that a remote user can dictate actuation and movement direction of selection block 633 through appropriate signaling, and/or so that system selector 630 may provide feedback to users as to status, position, errors, etc.

Figure 4A:
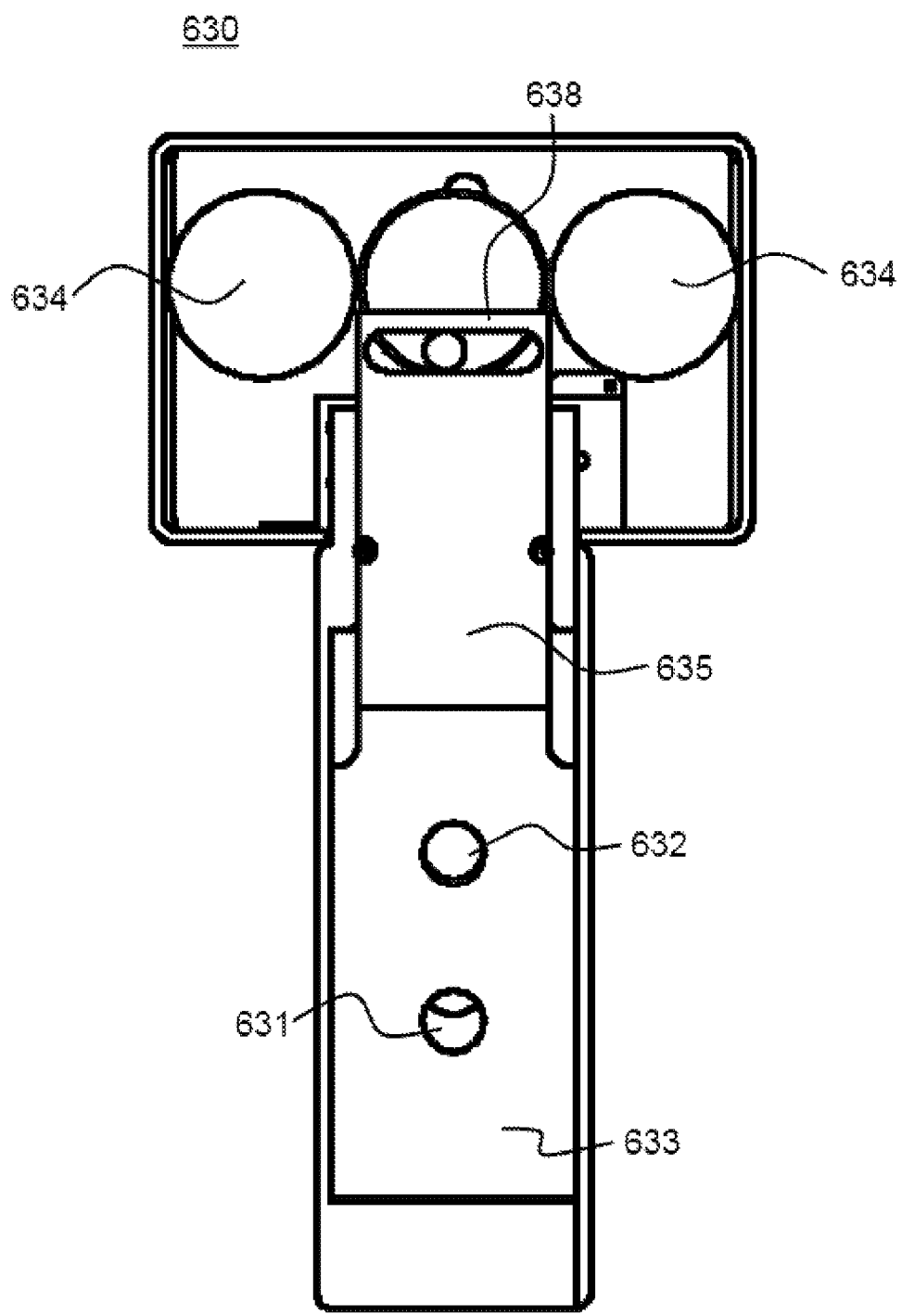
FIGS. 4a & 4b are illustrations of an example embodiment system selector in various configurations.
Figure 4B:
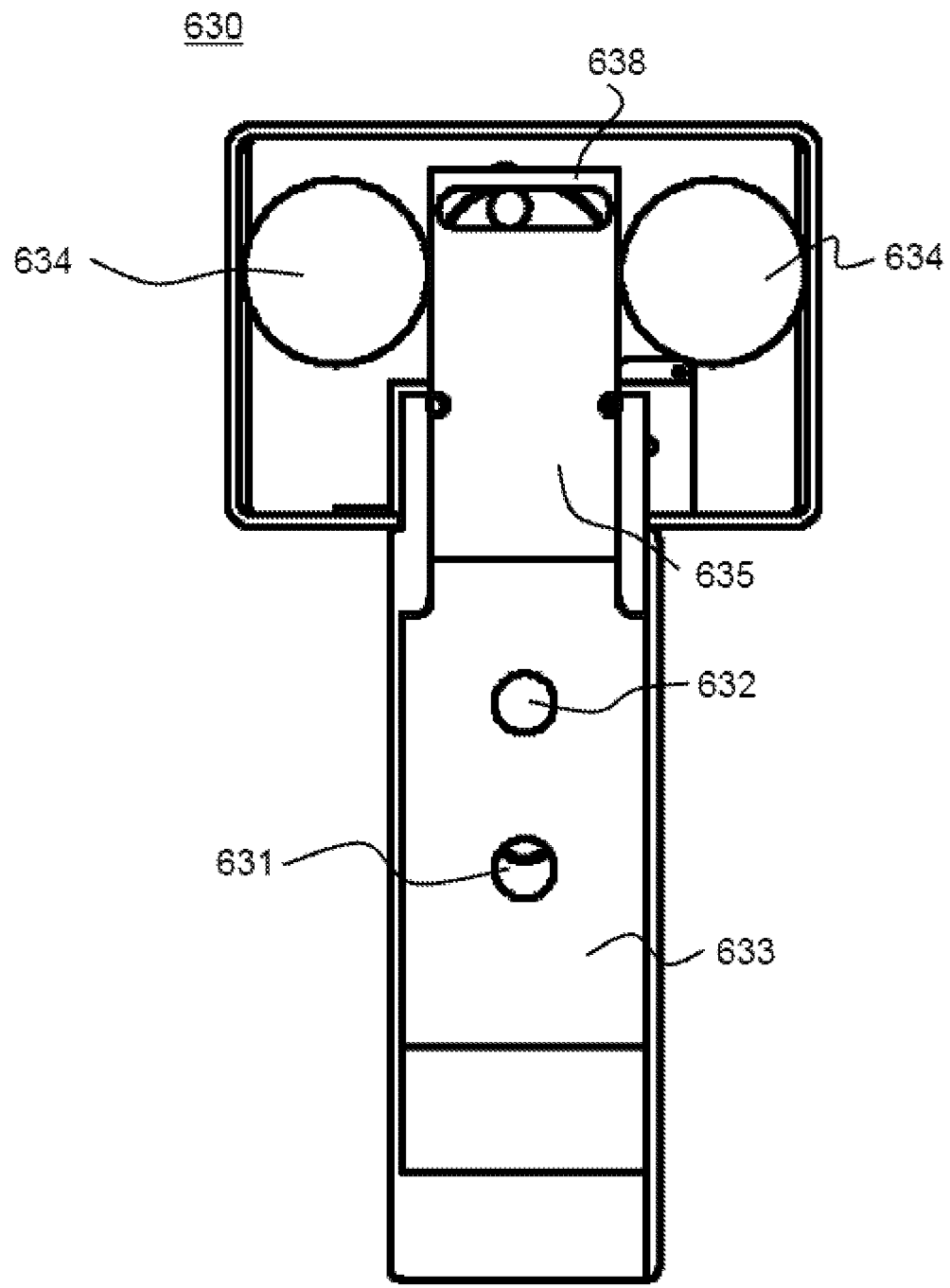

FIGS. 4a and 4b are side views of example embodiment system selector 630 showing two different configurations of selection block 633. In FIG. 4a, piston 635 and selection block 633 have been lowered such that only upper distinct path 632 connects to shared penetration pathway 1100b and has access to in instrumentation tube connected thereto. In this configuration, a complete penetration pathway 1100 may be formed between 1100a and 1100b and provide loading and/or harvesting of irradiation targets from/to instrumentation tubes and loading/harvesting systems. In this configuration, lower distinct path 631 does not connect to shared penetration pathway 1100b and may be blocked in this configuration. Alternately, TIP tube 300 may not connect to lower distinct path 631 in the configuration of FIG. 4a, to further prevent and/or block any TIP instrumentation from even entering selection block 633. In FIG. 4b, piston 635 and selection block 633 have been raised such that only lower distinct path 631 connects to shared penetration pathway 1100b and has access to in instrumentation tube connected thereto. In this configuration, a complete penetration pathway may be formed between TIP tube 300 and shared penetration pathway 1100b and provide access of TIP or other instrumentation from/to instrumentation tubes without interaction with irradiation targets and harvesting/loading systems for the same. In this configuration, upper distinct path 632 does not connect to shared penetration pathway 1100b and may be blocked in this configuration. Alternately, irradiation target penetration pathway 1100a may not connect to upper distinct path 632 in the configuration of FIG. 4a, to further prevent and/or block any irradiation targets from even entering selection block 633.

Figure 5:
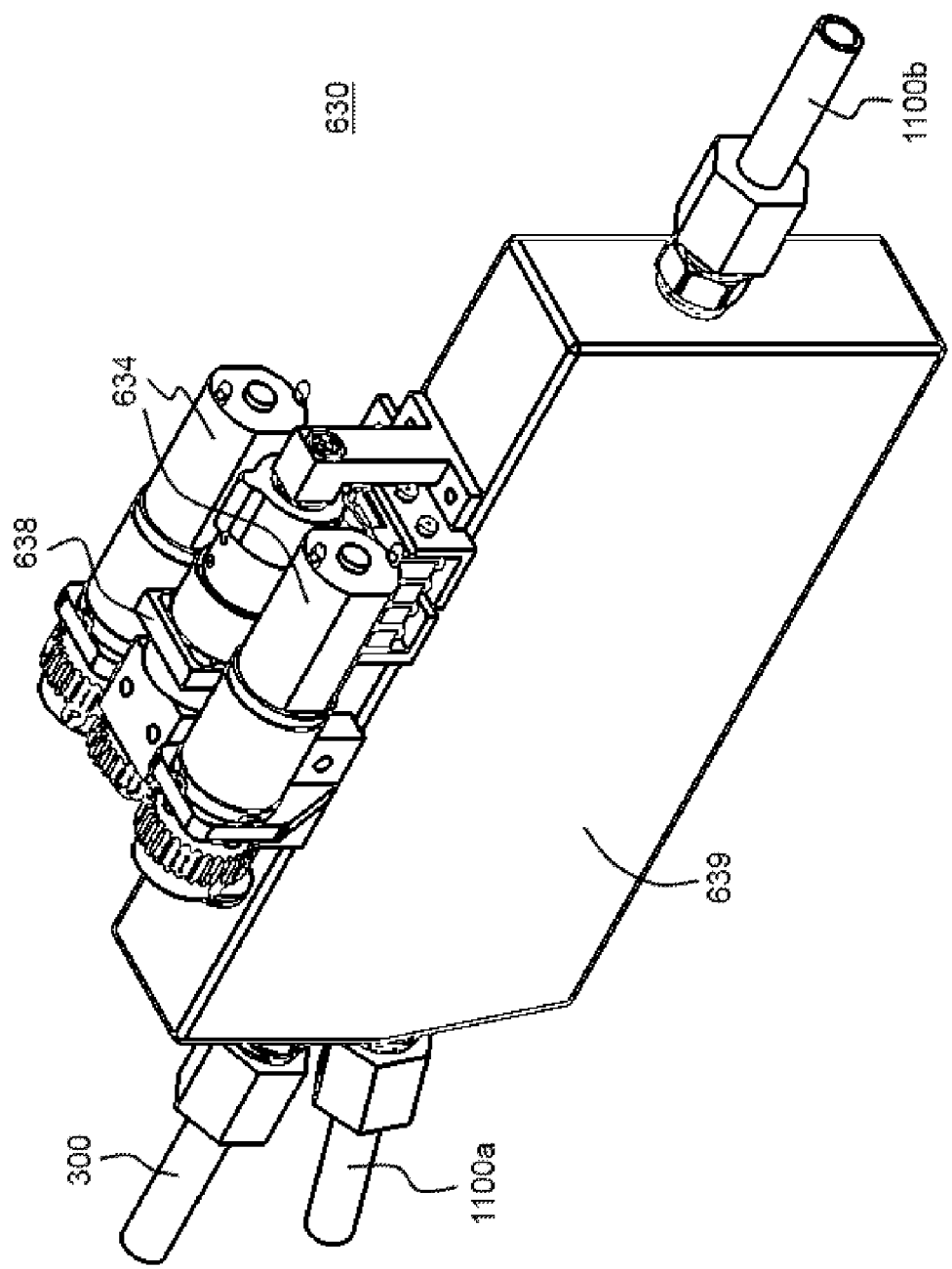
FIG. 5 is an illustration of an example embodiment system selector.

FIG. 5 is an illustration of example embodiment system selector 630 including an outside frame 639 that may receive and align the various entries and exits 1100a, 1100b, 300 with specific positions of selection block 633 (FIG. 3) and distinct pathways 631 and 632 therein (FIG. 3). Outside frame 639 may also serve to terminally block pathways that are not selectively aligned by example embodiment system selector 630. In this way, only a single system may have ultimate access to shared penetration pathway 1100b and instrumentation tube(s) 50 (FIG. 2) connected thereto. Non-aligned systems may further be prevented from accessing, or blocking or causing malfunction in, example embodiment system selector 630 due to the blocking nature of outside frame 639. It is further understood that various entrances and exits between systems interacting with example embodiment system selector 630 may have any position or orientation; for example, in FIG. 5, TIP Tube 300 and exclusive penetration pathway 1100a are in opposite vertical positioning from the example of FIGS. 3-5.

Although example embodiment system selector 630 is shown with a vertical discrimination function in selection block 633, it is understood that horizontal or other angled movement, driving, and positioning of selection block 633, with respect to penetration pathways or driving motors, are useable in example embodiments. For example, motors 634 may drive crankshaft 638, piston 635, and selection block 633 horizontally to select between two or more distinct paths 631/632 that may be side-by-side in selection block 633. Furthermore, it is understood that more than two distinct paths can be provided by a single selection block 633, potentially creating three or more distinct access paths into a single shared penetration pathway 1100a to accommodate several distinct activities and access needs to instrumentation tubes 50 (FIG. 2), while blocking several other inactive paths.

Even further, it is understood that other configurations for system selector 630 are useable as example embodiments in system 1000. For example, a rotatable Y-tube can be used to differentiate between various systems requiring access to instrumentation tubes at different times. Or, for example, system selector 630 may use a turntable that rotates instead of using vertical or horizontal displacement. Even further, system selector 630 can use a variety of known diverters, selectors, gating arrangements, and routers useable in nuclear reactor environments to discriminate between multiple systems for shared access.

Example embodiments and methods thus being described, it will be appreciated by one skilled in the art that example embodiments may be varied and substituted through routine experimentation while still falling within the scope of the following claims. For example, the types and locations of system selectors that gate various penetration pathways are not limited to the specific systems shown and described in the figures—other specific devices and systems for reliably selecting one path for equipment access into an access-restricted area of a nuclear power station and instrumentation tube are equally useable as example embodiments and fall within the scope of the claims. Furthermore, it is understood that example systems and methods are useable in any type of nuclear plant with access barriers that prevent unlimited access to the reactor, including known light water reactor designs, graphite-moderated reactors, and/or molten salt reactors, as well as any other nuclear plant design. Such variations are not to be regarded as departure from the scope of the following claims.

What is claimed is:

1. A system for managing irradiation targets and instrumentation access to a nuclear reactor, the system comprising:
   a penetration pathway connecting an origin point outside an access barrier of the nuclear reactor to an instrumentation tube extending into the nuclear reactor inside the access barrier, wherein the penetration pathway is traversable by at least one irradiation target and the instrumentation to the instrumentation tube, wherein the penetration pathway includes,
      one of at least one instrumentation path and at least one irradiation target path distinct from the instrumentation path, and
      at least one shared path; and
   a selector inside the access barrier, wherein the selector is configured to connect only one of the instrumentation path and the irradiation target path to the shared path so as to form the penetration pathway.

2. The system of claim 1, wherein,
   the irradiation target path connects to an irradiation target loading/offloading system, and
   the instrumentation path connects to a TIP system.

3. The system of claim 1, wherein the selector is positioned at a pedestal of the nuclear reactor.

4. The system of claim 3, wherein the shared path connects the selector to the instrumentation tube and extends entirely within the pedestal, and wherein the irradiation target path and the instrumentation path extend entirely outside of the pedestal.

5. The system of claim 1, wherein the shared path connects the selector to multiple instrumentation tubes.

6. The system of claim 1, wherein the access barrier is a nuclear reactor containment building.

7. The system of claim 1, further comprising:
   at least one irradiation target moveable within the irradiation target path and the shared path.

8. The system of claim 7, wherein,
   the at least one irradiation target are a plurality of irradiation targets, and
   the plurality of irradiation targets are spherical.

9. The system of claim 8, wherein,
   the irradiation target path and the shared path are tubing continuously connecting an irradiation target loading/offloading system and the instrumentation tube via the selector, and
   the tubing is sized to permit the plurality of irradiation targets to roll in the tubing.

10. The system of claim 1, wherein the selector includes,
    a first selection path configured to connect to only the instrumentation path, and
    a second selection path distinct from the first selection path and configured to connect to only the irradiation target path.

11. The system of claim 10, wherein the selector further includes a moveable block containing the first and the second selection paths, and wherein only one of the first and the second selection paths connects to the shared path based on a position of the moveable block.

12. The system of claim 11, wherein selector further includes at least one motor and a piston connecting the moveable block to the motor, and wherein the motor is configured to rotate so as to move the moveable block to the position.

13. The system of claim 11, wherein the selector further includes an exterior frame configured to block at least one of the first and the second selection paths that is not connected to the shared path.

14. A system for managing irradiation targets and instrumentation, the system comprising:
a nuclear reactor including an instrumentation tube; and
a means for delivering instrumentation and irradiation targets from outside an access barrier of the nuclear reactor into the instrumentation tube and vice versa, wherein the means includes at least one selector inside of a containment building of the nuclear reactor, wherein the selector is configured to selectively provide access within the access barrier to the irradiation targets and the instrumentation.

15. The system of claim 1, further comprising:
an irradiation target reservoir outside the access barrier connected to the origin point; and
a harvesting container outside the access barrier connected to the origin point, wherein the harvesting container and the irradiation target reservoir connect to the origin point through separate paths from each other.

16. The system of claim 15, further comprising:
a loading junction at the origin point, wherein the loading junction is configured to connect only one of the irradiation target reservoir and the harvesting container to the penetration pathway at any given time.

17. The system of claim 16, further comprising:
a retaining flange on the penetration pathway below the instrumentation tube and inside the selector, wherein the retaining flange is configured to hold irradiation targets in the instrumentation tube while the penetration pathway is not filled with irradiation targets.

18. The system of claim 1, further comprising:
a plurality of irradiation targets that are unjoined from one another and are moveable in the penetration pathway independent of each other.

19. The system of claim 14, wherein the irradiation targets are not connected and are free to individually roll in the means for delivering instrumentation and irradiation targets.

* * * * *